United States Patent
Tang

(10) Patent No.: US 10,025,332 B2
(45) Date of Patent: Jul. 17, 2018

(54) OVERHEAT PROTECTION METHOD AND APPARATUS FOR HAND-HELD ELECTRONIC DEVICE, AND HAND-HELD ELECTRONIC DEVICE

(71) Applicant: Huawei Device (Dongguan) Co., Ltd., Dongguan (CN)

(72) Inventor: Wenbing Tang, Shanghai (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 294 days.

(21) Appl. No.: 14/651,406

(22) PCT Filed: Dec. 25, 2013

(86) PCT No.: PCT/CN2013/090382
§ 371 (c)(1),
(2) Date: Jun. 11, 2015

(87) PCT Pub. No.: WO2014/101757
PCT Pub. Date: Jul. 3, 2014

(65) Prior Publication Data
US 2016/0048144 A1 Feb. 18, 2016

(30) Foreign Application Priority Data

Dec. 26, 2012 (CN) .......................... 2012 1 0574640

(51) Int. Cl.
*G06F 1/20* (2006.01)
*G05D 23/19* (2006.01)
*G05B 15/02* (2006.01)

(52) U.S. Cl.
CPC ......... *G05D 23/1928* (2013.01); *G05B 15/02* (2013.01); *G06F 1/206* (2013.01)

(58) Field of Classification Search
CPC ...... G05D 23/1928; G05B 15/02; G06F 1/206
(Continued)

(56) References Cited

U.S. PATENT DOCUMENTS

2006/0149974 A1* 7/2006 Rotem .................... G06F 1/206
713/300
2006/0178117 A1 8/2006 Liedtke
(Continued)

FOREIGN PATENT DOCUMENTS

CN 101485100 A 7/2009
CN 201359467 Y 12/2009
(Continued)

OTHER PUBLICATIONS

Thermistor. Collins English Dictionary [online], HarperCollins Publishers. Jun. 27, 2012 [Retrieved May 11, 2017] <URL: https://web.archive.org/web/20120627071849/https://www.collinsdictionary.com/dictionary/english/thermistor>.*

*Primary Examiner* — Shon Foley
(74) *Attorney, Agent, or Firm* — Leydig, Voit & Mayer, Ltd.

(57) ABSTRACT

The present invention provides an overheat protection method and apparatus for a hand-held electronic device, and an electronic hand-held device. The method includes: obtaining a cold zone temperature from a cold zone collection point, where the cold zone collection point is arranged in a position, away from a heat emitting element, of the hand-held electronic device; and selecting an overheat protection scheme that corresponds to the cold zone temperature and a hot zone temperature. In the overheat protection technology of a hand-held electronic device provided in embodiments of the present invention, a cold zone temperature is obtained, and an overheat protection scheme is selected by considering the cold zone temperature, so that overheat protection of the hand-held electronic device can put multipoint temperatures into consideration and is highly adaptable.

11 Claims, 2 Drawing Sheets

(58) Field of Classification Search
USPC .......................................................... 700/299
See application file for complete search history.

(56) References Cited

U.S. PATENT DOCUMENTS

| | | |
|---|---|---|
| 2007/0142058 A1 | 6/2007 | Matsumura et al. |
| 2008/0004067 A1 | 1/2008 | Piipponen et al. |
| 2009/0052105 A1 | 2/2009 | Soleimani et al. |
| 2011/0176275 A1* | 7/2011 | Sato ..................... G06F 1/206 |
| | | 361/695 |
| 2012/0022808 A1 | 1/2012 | Liebenow |
| 2015/0057830 A1* | 2/2015 | Slaby ................ G05D 23/1917 |
| | | 700/300 |

FOREIGN PATENT DOCUMENTS

| | | |
|---|---|---|
| CN | 101819457 A | 9/2010 |
| CN | 101828190 A | 9/2010 |
| CN | 102301553 A | 12/2011 |
| CN | 102789246 A | 11/2012 |
| CN | 103049018 A | 4/2013 |
| JP | 2007096925 A | 4/2007 |
| WO | WO 2010141212 A1 | 12/2010 |

\* cited by examiner

OVERHEAT PROTECTION METHOD AND APPARATUS FOR HAND-HELD ELECTRONIC DEVICE, AND HAND-HELD ELECTRONIC DEVICE

This application is a National Stage of International Application No. PCT/CN2013/090382, filed Dec. 25, 2013, which claims priority to Chinese Patent Application No. 201210574640.4, filed Dec. 26, 2012, both of which are hereby incorporated by reference in their entireties.

TECHNICAL FIELD

Embodiments of the present invention relate to heat protection technologies of a hand-held electronic device, and in particular, to an overheat protection method and apparatus for a hand-held electronic device, and a hand-held electronic device.

BACKGROUND

An overheat protection apparatus is a necessary part of a hand-held electronic device, such as a mobile phone. Circuits of the hand-held electronic device can be protected by means of overheat protection, so as to achieve a better use effect of a user. The overheat protection refers to that: a housing temperature is mapped by using a hot zone temperature, and when the hot zone temperature is higher than a threshold, a system starts measures such as frequency limiting, to reduce power consumption of the device, so as to achieve an objective of reducing the housing temperature finally and protect a human body from being scalded by a contact surface of a hand-held terminal.

In an overheat protection technology commonly used in an existing hand-held electronic device, an overheat protection scheme is triggered to start according to an absolute temperature of a reference hot point on the hand-held electronic device. For example, a hot zone sensor is often arranged in a main board position of a mobile phone and is used as the reference hot point for collecting a temperature. When the temperature of a collection point reaches a threshold, the overheat protection scheme is started, and the overheat protection scheme often is frequency limiting or current limiting.

However, in the foregoing overheat protection technology of an existing hand-held electronic device, two problems generally exist:

1. An operation in the overheat protection scheme can only be based on an absolute temperature of a reference hot point, but cannot change according to an ambient temperature in specific use, and therefore has poor adaptability.

2. In an environment having a relatively low ambient temperature, an absolute temperature can be used as a startup threshold of the overheat protection scheme; however, when the ambient temperature is relatively high, if the absolute temperature is used only, it is easily caused that the overheat protection scheme is triggered frequently, thereby finally affecting use performance of a user.

SUMMARY

The present invention provides an overheat protection method and apparatus for a hand-held electronic device, and a hand-held electronic device, so as to solve defects in the prior art that because overheat protection is performed only according to a single temperature, adaptability is poor and overheat protection is triggered frequently.

According to a first aspect, an embodiment of the present invention provides an overheat protection method for a hand-held electronic device, including:

obtaining a cold zone temperature from a cold zone collection point, where the cold zone collection point is arranged in a position, away from a heat emitting element, of the hand-held electronic device; and selecting an overheat protection scheme that corresponds to the cold zone temperature and a hot zone temperature.

In a first possible implementation manner of the first aspect, the selecting an overheat protection scheme that corresponds to the cold zone temperature and a hot zone temperature specifically includes:

comparing the cold zone temperature with a set threshold, and determining a current ambient temperature section; and selecting an overheat protection scheme that corresponds to the ambient temperature section and the hot zone temperature.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In a third possible implementation manner of the first aspect, the obtaining a cold zone temperature includes:

obtaining temperature values from the cold zone collection point according to a set period; and calculating an average value of multiple temperature values within set duration as the cold zone temperature.

In a fourth possible implementation manner of the first aspect, the cold zone collection point is a thermistor that is connected in series between a current source and a ground cable, and the obtaining a cold zone temperature from a cold zone collection point includes:

obtaining a voltage change in the thermistor, and calculating the cold zone temperature according to the voltage change.

According to a second aspect, an embodiment of the present invention provides an overheat protection apparatus for a hand-held electronic device, including:

a cold zone temperature collection module, configured to obtain a cold zone temperature from a cold zone collection point, where the cold zone collection point is arranged in a position, away from a heat emitting element, of the hand-held electronic device; and an overheat protection scheme selecting module, configured to select an overheat protection scheme that corresponds to the cold zone temperature and a hot zone temperature.

In a first possible implementation manner of the second aspect, the overheat protection scheme selecting module includes:

a threshold comparing unit, configured to compare the cold zone temperature with a set threshold, and determine a current ambient temperature section; and a solution selecting unit, configured to select an overheat protection scheme that corresponds to the ambient temperature section and the hot zone temperature.

In a third possible implementation manner of the second aspect, the overheat protection scheme selecting module includes:

a temperature section identification unit, configured to identify a temperature section of the cold zone temperature;

a first subscheme triggering unit, configured to: when it is obtained through identification that the cold zone temperature is less than or equal to a first threshold, determine that it is currently in a first ambient temperature section, and trigger to execute a first subscheme according to the hot zone temperature;

a second subscheme triggering unit, configured to: when it is obtained through identification that the cold zone temperature is greater than the first threshold and less than or equal to a second threshold, determine that it is currently in a second ambient temperature section, and trigger to execute a second subscheme according to the hot zone temperature; and a third subscheme triggering unit, configured to: when it is obtained through identification that the cold zone temperature is greater than the second threshold, determine that it is currently in a third ambient temperature section, and trigger to execute a third subscheme according to the hot zone temperature.

According to a third aspect, an embodiment of the present invention provides a hand-held electronic device, including:

a cold zone collection point arranged in a position, away from a heat emitting element, of the hand-held electronic device.

In a first possible implementation manner of the third aspect, the cold zone collection point is a thermistor that is connected in series between a current source and a ground cable.

In the overheat protection technology of a hand-held electronic device provided in the embodiments of the present invention, a cold zone temperature is obtained, and an overheat protection scheme is selected according to the cold zone temperature, so that overheat protection for the hand-held electronic device can put multipoint temperatures into consideration comprehensively, so as to solve defects in an existing overheat protection technology that adaptability is poor and overheat protection is triggered frequently.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Embodiment 1

Figure 1A:
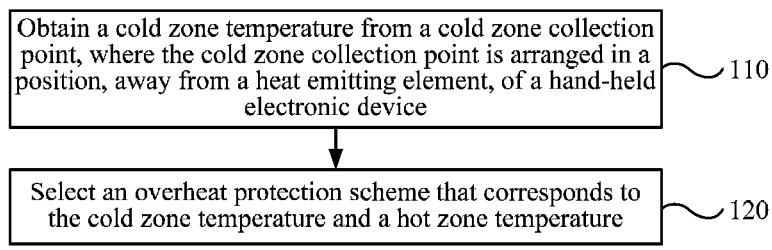
FIG. 1A is a flowchart of an overheat protection method for a hand-held electronic device according to Embodiment 1 of the present invention.

FIG. 1A is a flowchart of an overheat protection method for a hand-held electronic device according to Embodiment 1 of the present invention. This embodiment is applicable to overheat protection on the hand-held electronic device. The method can be executed by an overheat protection apparatus of the hand-held electronic device, and the apparatus may be implemented in a form of hardware and/or software and is integrated in the hand-held electronic device. The hand-held electronic device may be any terminal device such as a mobile phone or a tablet computer. The method specifically includes the following steps:

Step 110. Obtain a cold zone temperature from a cold zone collection point, where the cold zone collection point is arranged in a position, away from a heat emitting element, of the hand-held electronic device.

The heat emitting element may be any element capable of emitting heat on the hand-held electronic device, and generally is an element such as a host or a printed circuit board (Printed Circuit Board, briefly referred to as PCB). The temperature collected from the cold zone collection point needs to reflect an ambient temperature of the hand-held electronic device; therefore, the cold zone collection point should be away from the heat emitting element as far as possible to avoid being affected by the heat emitting element, so that a relatively accurate ambient temperature can be collected.

Step 120. Select an overheat protection scheme that corresponds to the cold zone temperature and a hot zone temperature.

The hot zone temperature is a temperature collected from a hot zone collection point on the hand-held electronic device. The hot zone collection point is often close to the heat emitting element on the hand-held electronic device and monitors whether a temperature of the heat emitting element is excessively high. In this embodiment, there is more than one overheat protection scheme. When the overheat protection scheme is determined, both the hot zone temperature and the cold zone temperature are considered, so that a suitable overheat protection scheme is selected.

In the technical solution of this embodiment, the cold zone temperature is obtained from the cold zone collection point, and the corresponding overheat protection scheme is selected according to the cold zone temperature and the hot zone temperature, thereby solving defects that because only a temperature change of a single point is considered in an existing heat protection solution, adaptability of the overheat protection technology is poor and overheat protection is triggered frequently.

The technical solution of this embodiment is especially applicable to a case in which an impact of an ambient temperature on the overheat protection is considered. In the technical solution of this embodiment, the cold zone temperature generally can reflect a level of the ambient temperature, a corresponding heat protection subscheme is selected from multiple preset heat protection solutions, and differences between different ambient temperatures are fully considered, so that a frequency limiting solution is not started too early or frequently when the ambient temperature is excessively high, and unpleasant user experience is avoided. When it is detected that the ambient temperature is high, a temperature threshold of frequency limiting is increased; therefore, the hand-held electronic device can operate normally in some common application scenarios even though the ambient temperature is relatively high.

Based on the foregoing technical solution, an operation of obtaining the cold zone temperature preferably includes the following steps: obtaining temperature values from the cold zone collection point according to a set period, and calculating an average value of multiple temperature values within set duration as the cold zone temperature. Obtaining the average value of the cold zone temperatures can enable the cold zone temperature to be close to the ambient temperature as far as possible.

Based on the foregoing technical solution, the selecting an overheat protection scheme that corresponds to the cold zone temperature and a hot zone temperature preferably includes the following steps: comparing the cold zone temperature with a set threshold, and determining a current ambient temperature section; and selecting an overheat protection scheme that corresponds to the ambient temperature section and the hot zone temperature. Three ambient temperature sections can be specifically obtained through division: first identifying a temperature section of the cold zone temperature; when it is obtained through identification that the cold zone temperature is less than or equal to a first threshold, determining that it is currently in a first ambient temperature section, and triggering to execute a first subscheme according to the hot zone temperature; when it is obtained through identification that the cold zone temperature is greater than the first threshold and less than or equal to a second threshold, determining that it is currently in a second ambient temperature section, and triggering to execute a second subscheme according to the hot zone temperature; and when it is obtained through identification that the cold zone temperature is greater than or equal to the second threshold, determining that it is currently in a third ambient temperature section, and triggering to execute a third subscheme according to the hot zone temperature.

Figure 1B:
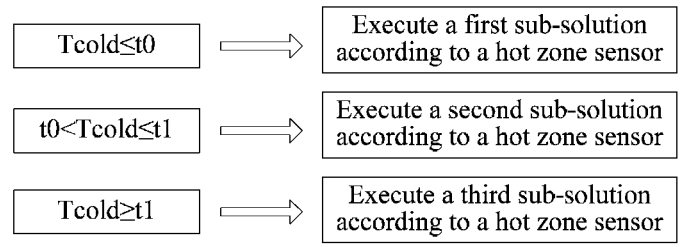
FIG. 1B is a schematic diagram of a correspondence, between a cold zone temperature and an overheat protection scheme, applicable to Embodiment 1 of the present invention.

For example, the temperature section is determined by comparing the cold zone temperature Tcold with a first preset threshold t0 and a second preset threshold t1, and multiple preset heat protection subschemes are invoked selectively according to a hot zone temperature of a hot zone sensor (sensor), so as to perform the first subscheme, the second subscheme, or the third subscheme. In the second subscheme, the hot zone temperature threshold is generally increased by 3 to 5 degrees, and in the third subscheme, the hot zone temperature threshold can be further increased. For different subschemes, internal circulation levels of the heat protection subschemes can be reduced at the same time, that is, it can be controlled that measures implemented in the heat protection subschemes to reduce power of a device so as to reduce the temperature are different, and periods of circular overheat temperature monitoring are different. A correspondence between the three subschemes and the thresholds is shown in FIG. 1B, which is a schematic diagram of a correspondence, between the cold zone temperature and the overheat protection scheme, applicable in Embodiment 1 of the present invention.

A subscheme of the existing technical solution of overheat protection is unique, and does not change as the cold zone temperature changes. In the technical solution of this embodiment, an ambient temperature is monitored by using a cold zone temperature, and a hot zone temperature is considered in combination, so that a corresponding heat protection subscheme can be selected from multiple preset heat protection solutions; therefore, a hand-held electronic device can adapt more effectively to an environment such as an environment having an excessively high temperature.

Embodiment 2

Figure 2:
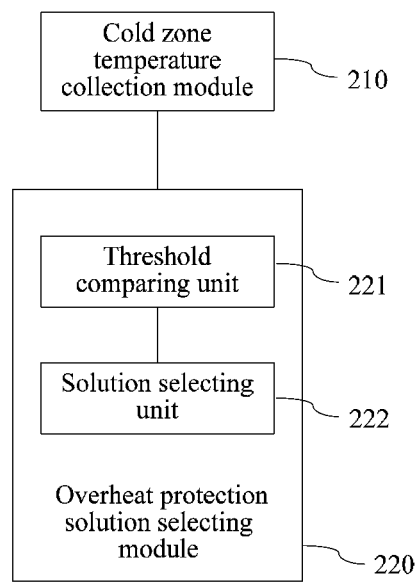
FIG. 2 is a schematic structural diagram of an overheat protection apparatus for a hand-held electronic device according to Embodiment 2 of the present invention.

FIG. 2 is a schematic structural diagram of an overheat protection apparatus for a hand-held electronic device according to Embodiment 2 of the present invention. The apparatus of this embodiment can be configured to execute the technical solution of the overheat protection method for a hand-held electronic device provided in Embodiment 1 of the present invention shown in FIG. 1. The apparatus specifically includes the following: a cold zone temperature collection module 210 and an overheat protection scheme selecting module 220.

The cold zone temperature collection module 210 is configured to obtain a cold zone temperature from a cold zone collection point, where the cold zone collection point is arranged in a position, away from a heat emitting element, of the hand-held electronic device; and the overheat protection scheme selecting module 220 is configured to select an overheat protection scheme that corresponds to the cold zone temperature and a hot zone temperature.

Based on the above, the overheat protection scheme selecting module 220 preferably includes: a threshold comparing unit 221 and a solution selecting unit 222, where the threshold comparing unit 221 is configured to compare the cold zone temperature with a set threshold, and determine a current ambient temperature section; and the solution selecting unit 222 is configured to select an overheat protection scheme corresponding to the ambient temperature section and the hot zone temperature.

Specifically, the overheat protection scheme selecting module may include: a temperature section identification unit, a first subscheme triggering unit, a second subscheme triggering unit, and a third subscheme triggering unit, where the temperature section identification unit is configured to identify a temperature section of the cold zone temperature; the first subscheme triggering unit is configured to: when it is obtained through identification that the cold zone temperature is less than or equal to a first threshold, determine that it is currently in a first ambient temperature section, and trigger to execute a first subscheme according to the hot zone temperature; the second subscheme triggering unit is configured to: when it is obtained through identification that the cold zone temperature is greater than the first threshold and less than or equal to a second threshold, determine that it is currently in a second ambient temperature section, and trigger to execute a second subscheme according to the hot zone temperature; and the third subscheme triggering unit is configured to: when it is obtained through identification that the cold zone temperature is greater than the second threshold, determine that it is currently in a third ambient temperature section, and trigger to execute a third subscheme according to the hot zone temperature.

This embodiment is used to execute the technical solution of the overheat protection method for a hand-held electronic device provided in the embodiments of the present invention, includes corresponding functional modules, and has a similar implementation principle and beneficial effect, and no further details are provided herein again.

Based on the foregoing technical solution, the cold zone temperature collection module 210 preferably may be a negative coefficient thermistor that is connected in series between a constant current source and a ground cable, obtain a voltage change in the thermistor, and calculate the cold zone temperature according to the voltage change. In this solution, a real-time temperature of the cold zone collection point can be measured accurately.

Figure 3:
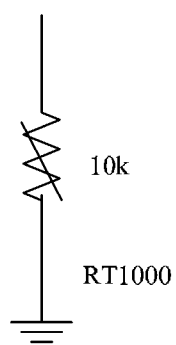
FIG. 3 is a schematic circuit diagram of a cold zone thermistor in a hand-held electronic device according to Embodiment 3 of the present invention.

Based on the foregoing technical solution, the threshold comparing unit module 221 preferably sets two thresholds, that is, a first threshold t0 and a second threshold t1, and the cold zone temperature is marked as Tcold, as shown in FIG. 3. When Tcold≤t0, the first subscheme is executed according to the hot zone temperature; when t0<Tcold≤t1, the second subscheme is executed according to the hot zone temperature; and when Tcold≥t1, the third subscheme is executed according to the hot zone temperature, as shown in FIG. 1B.

In this solution, multiple heat protection subschemes are preset, so that a protection action is not triggered too early or frequently when the ambient temperature is excessively high, and unpleasant user experience is avoided.

This embodiment of the present invention further provides a hand-held electronic device. The device includes a cold zone collection point arranged in a position, away from a heat emitting element, of the hand-held electronic device; and also includes the overheat protection apparatus for a hand-held electronic device provided in any embodiment of the present invention. The overheat protection apparatus provided in the embodiment of the present invention may be implemented by using hardware, but is preferably implemented by using software. The software may be code or an instruction set, which is configured in a memory of the hand-held electronic device, so that a processor, such as a CPU, and a controller invoke and execute the code or the instruction set, so as to implement overheat protection in cooperation with other hardware of the hand-held electronic device.

The hand-held electronic device can implement all functions of the foregoing embodiments and has a similar implementation principle and beneficial effect, and no further details are provided herein again.

Based on the foregoing embodiments, the cold zone collection point is preferably a thermistor R1 that is connected in series between a current source and a ground cable. The cold zone temperature is obtained from the cold zone collection point located inside a section, away from a main board (a hot zone), of a hand-held device housing, for example, at an end, connected to a daughter board motor, of a main circuit board or on a daughter board motor. Related matching circuits include: a negative coefficient thermistor and a constant current source. A corresponding temperature value is calculated by monitoring a voltage change. The hand-held electronic device is also provided with a collection point of the hot zone temperature, such as a temperature sensor. The temperature sensor may also collect a temperature in a form of thermistor.

In conclusion, in the technical solution of this embodiment, a cold zone temperature is obtained from a cold zone collection point, and a corresponding overheat protection scheme is selected according to the cold zone temperature and a hot zone temperature, thereby solving two defects that an existing heat protection solution cannot be changed according to an ambient temperature and a protection action is triggered frequently when the ambient temperature is excessively high. In the technical solution of this embodiment, a corresponding heat protection subscheme is selected from multiple preset heat protection subschemes according to a level of the ambient temperature, and differences between different ambient temperatures are fully considered, so that a frequency limiting solution is not started too early or frequently when the ambient temperature is excessively high, and unpleasant user experience is avoided. Moreover, when it is detected that the ambient temperature is high, a temperature threshold of frequency limiting is increased; therefore, the hand-held electronic device can operate normally in some common application scenarios even though the ambient temperature is relatively high.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An overheat protection method for a hand-held electronic device, comprising:

obtaining, by an overheat protection apparatus, a cold zone temperature from a cold zone collection point and a hot zone temperature from a hot zone collection point, wherein the cold zone temperature corresponds to an ambient temperature and the hot zone temperature corresponds to a heat-emitting element of the hand-held electronic device, and wherein the cold zone collection point is arranged in a position away from the heat-emitting element of the hand-held electronic device such that the cold zone collection point substantially avoids heating effects from the heat-emitting element;

determining, by the overheat protection apparatus, a hot zone temperature threshold based on the obtained cold zone temperature; and implementing, by the overheat protection apparatus, an overheat protection scheme based on the hot zone temperature threshold being exceeded;

wherein determining the hot zone temperature threshold based on the obtained cold zone temperature comprises:

(a) based on the obtained cold zone temperature being less than or equal to a first threshold, determining the hot zone temperature threshold to be a first value;

(b) based on the cold zone temperature being greater than the first threshold and less than or equal to a second threshold, determining the hot zone temperature threshold to be a second value, wherein the second value is greater than the first value; or (c) based on the cold zone temperature being greater than or equal to the second threshold, determining the hot zone temperature threshold to be a third value, wherein the third value is greater than the second value.

2. The overheat protection method according to claim 1, wherein obtaining the cold zone temperature comprises:

obtaining temperature values from the cold zone collection point according to a set period;

wherein an average value of multiple temperature values obtained within the set period is the obtained cold zone temperature.

3. The overheat protection method according to claim 1, wherein the cold zone collection point is a thermistor that is connected in series between a current source and a ground cable, and obtaining the cold zone temperature from the cold zone collection point comprises:
   determining a voltage change in the thermistor, wherein the obtained cold zone temperature is based on the determined voltage change.

4. An overheat protection apparatus for a hand-held electronic device, comprising a processor and a non-transitory computer-readable medium having processor-executable instructions stored thereon, wherein the processor-executable instructions, when executed by the processor, facilitate the following:
   obtaining a cold zone temperature from a cold zone collection point and a hot zone temperature from a hot zone collection point, wherein the cold zone temperature corresponds to an ambient temperature and the hot zone temperature corresponds to a heat-emitting element of the hand-held electronic device, and wherein the cold zone collection point is arranged in a position away from the heat-emitting element of the hand-held electronic device such that the cold zone collection point substantially avoids heating effects from the heat-emitting element;
   determining a hot zone temperature threshold based on the obtained cold zone temperature; and
   implementing an overheat protection scheme based on the hot zone temperature threshold being exceeded;
   wherein determining the hot zone temperature threshold based on the obtained cold zone temperature comprises:
      if the obtained cold zone temperature is less than or equal to a first threshold, determining the hot zone temperature threshold to be a first value;
      if the cold zone temperature is greater than the first threshold and less than or equal to a second threshold, determining the hot zone temperature threshold to be a second value, wherein the second value is greater than the first value; and
      if the cold zone temperature is greater than or equal to the second threshold, determining the hot zone temperature threshold to be a third value, wherein the third value is greater than the second value.

5. The overheat protection apparatus according to claim 4, wherein obtaining the cold zone temperature comprises:
   obtaining temperature values from the cold zone collection point according to a set period;
   wherein an average value of multiple temperature values obtained within the set period is the obtained cold zone temperature.

6. The overheat protection apparatus according to claim 4, wherein the cold zone collection point is a thermistor that is connected in series between a current source and a ground cable.

7. A hand-held electronic device, comprising:
   a heat-emitting element;
   a hot zone collection point, configured to obtain a hot zone temperature corresponding to the heat-emitting element of the hand-held electronic device;
   a cold zone collection point, configured to obtain a cold zone temperature, arranged in a position away from the heat-emitting element such that the cold zone collection point substantially avoids heating effects from the heat-emitting element; and
   a processor, configured to determine a hot zone temperature threshold based on the obtained cold zone temperature; and implement an overheat protection scheme based on the hot zone temperature threshold being exceeded;
   wherein determining the hot zone temperature threshold based on the obtained cold zone temperature comprises:
      if the obtained cold zone temperature is less than or equal to a first threshold, determining the hot zone temperature threshold to be a first value;
      if the cold zone temperature is greater than the first threshold and less than or equal to a second threshold, determining the hot zone temperature threshold to be a second value, wherein the second value is greater than the first value; and
      if the cold zone temperature is greater than or equal to the second threshold, determining the hot zone temperature threshold to be a third value, wherein the third value is greater than the second value.

8. The hand-held electronic device according to claim 7, wherein the cold zone collection point is a thermistor that is connected in series between a current source and a ground cable.

9. The overheat protection apparatus according to claim 6, wherein obtaining the cold zone temperature from the cold zone collection point comprises:
   determining a voltage change in the thermistor, wherein the obtained cold zone temperature is based on the determined voltage change.

10. The hand-held electronic device according to claim 7, wherein obtaining the cold zone temperature comprises:
    obtaining temperature values from the cold zone collection point according to a set period;
    wherein an average value of multiple temperature values obtained within the set period is the obtained cold zone temperature.

11. The hand-held electronic device according to claim 8, wherein obtaining the cold zone temperature from the cold zone collection point comprises:
    determining a voltage change in the thermistor, wherein the obtained cold zone temperature is based on the determined voltage change.

* * * * *